M. EHLBERT.
POULTRY COOPS.

No. 181,828. Patented Sept. 5, 1876.

WITNESSES:
E. Wolff
John Goethals

INVENTOR:
M. Ehlbert
BY
ATTORNEYS.

UNITED STATES PATENT OFFICE.

MARKUS EHLBERT, OF GREENVILLE, ALABAMA.

IMPROVEMENT IN POULTRY-COOPS.

Specification forming part of Letters Patent No. 181,828, dated September 5, 1876; application filed June 16, 1876.

*To all whom it may concern:*

Figure 1:
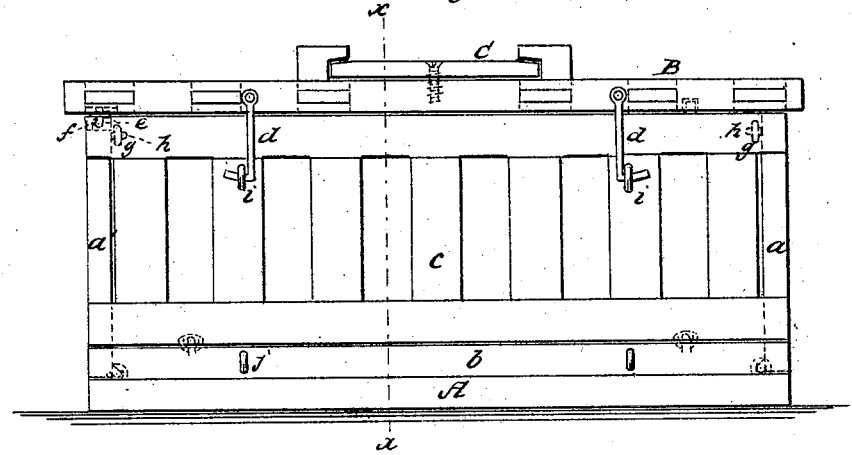
Figure 2:
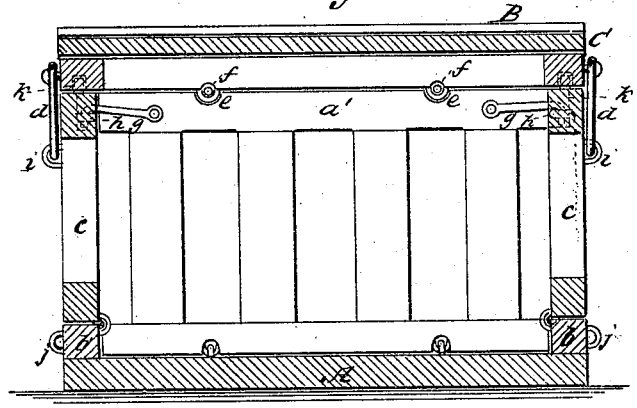
Figure 3:
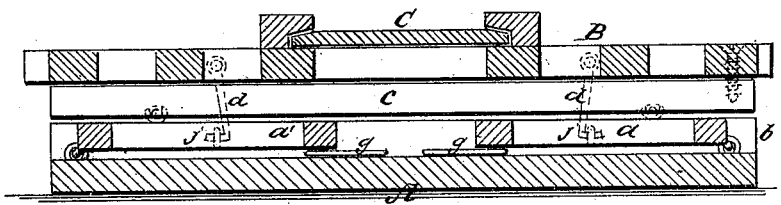

Be it known that I, MARKUS EHLBERT, of Greenville, in the county of Butler and State of Alabama, have invented a new and Improved Poultry-Coop, of which the following is a specification:

Figure 1 is a side elevation. Fig. 2 is a section on line $x\ x$ in Fig. 1. Fig. 3 is a longitudinal section of a coop when folded together.

Similar letters of reference indicate corresponding parts.

My invention consists in arranging the bars or grating forming the sides and top of a coop in such a way that they may be folded compactly together, the object being to provide a coop which may be used for shipping poultry, or a crate for other articles, which may be folded in small compass for reshipment.

A is the bottom of a coop, to which the end pieces $a\ a'$ are hinged, so as to be capable of folding on the bottom. $b\ b$ are cleats, which are attached to the bottom at each side, and are somewhat thicker than the end pieces $a\ a'$. The side pieces $c$ are hinged to the cleats $b$, so as to fold over the end pieces $a$. The top B is provided with a sliding cover, C, and the hooks $d$, and also the staples $e$. The end piece $a'$ has the fixed hooks $f$ placed in recesses in its upper edge, to engage with the staples $e$ on the cover. The end pieces $a\ a'$ are provided with the hooks $g$, which engage with staples $h$, placed in recesses in the side pieces. At $i$ are staples in the side pieces, which receive the hooks $d$. Staples $j$ are placed in the cleats $b$, to engage with the hooks $d$ when the coop is folded together. At $k$ are dowels, which project from the upper edge of the side pieces, and fit into corresponding holes in the top.

The ends, sides, and top may be made with slats, as in the drawing; or they may consist of frames covered with wire or rope netting.

When it is desired to set the coop up the hooks $d$ are loosened and the top B removed, the side pieces $c$ are turned into a vertical position, the end pieces $a\ a'$ are turned up at right angles with the bottom, and the hooks $g$ are hooked into the staples $h$. The staples $e$ are now placed on the hooks $f$ and the cover dropped down, so as to engage with the dowels $k$, when the hooks $d$ are made to engage with the staples $i$.

The top may be further secured by screws, if desired.

The sliding cover C is placed on the top for convenience; but it may be dispensed with.

Having thus described my invention, I claim as new and desire to secure by Letters Patent—

1. A coop composed of side and end pieces, hinged to a bottom in such a way that the end pieces may be folded on the bottom, and the side pieces folded on the end pieces, and the top placed over all and hooked to the bottom, substantially as shown and described.

2. The combination of the hinged end pieces $a\ a'$ and hinged side pieces $c$, hooks $g$ and $f$, top B, sliding cover C, hooks $d$, and bottom A, as shown and described.

MARKUS EHLBERT.

Witnesses:
 ALBERT A. EZEKIEL,
 A. STEINHART.